United States Patent [19]

Hayati et al.

[11] 4,218,354

[45] Aug. 19, 1980

[54] BINDER COMPOSITION AND COATING CONTAINING THE SAME

[75] Inventors: Hossein Hayati; John R. Flasch, both of Adrian, Mich.

[73] Assignee: Stauffer Chemical Company, Westport, Conn.

[21] Appl. No.: 671,871

[22] Filed: Mar. 29, 1976

Related U.S. Application Data

[63] Continuation of Ser. No. 453,760, Mar. 22, 1974, which is a continuation-in-part of Ser. No. 176,237, Aug. 30, 1971, abandoned, which is a continuation-in-part of Ser. No. 75,678, Sep. 25, 1970, abandoned.

[51] Int. Cl.$^2$ ............................................. C08L 83/04
[52] U.S. Cl. ........................... 260/29.2 M; 260/18 S; 260/33.2 SB; 260/37 SB; 528/12; 528/494
[58] Field of Search .................................. 260/29.2 M

[56] References Cited

U.S. PATENT DOCUMENTS

| | | | |
|---|---|---|---|
| 2,630,446 | 3/1953 | Gresham | 260/448.8 |
| 2,643,964 | 6/1953 | Smith-Johannsen | 260/448.8 |
| 2,706,723 | 4/1955 | Bass | 260/42 |
| 2,965,515 | 12/1960 | Jellinek | 117/126 |
| 3,218,287 | 11/1965 | Schmidle et al. | 260/33.6 |
| 3,392,036 | 7/1968 | McLeod | 106/1 |
| 3,395,117 | 7/1968 | Burzynski et al. | 260/46.5 R |
| 3,428,580 | 2/1969 | Nitzsche et al. | 260/46.5 R |
| 3,428,706 | 2/1969 | Jasinski et al. | 260/825 |
| 3,431,229 | 3/1969 | Levene | 260/33.4 |
| 3,457,221 | 7/1969 | Stengle | 260/46.5 R |

*Primary Examiner*—Murray Tillman
*Assistant Examiner*—Arthur H. Koeckert

[57] ABSTRACT

A binder composition is prepared by hydrolyzing and condensing an organotrihydrocarbonoxy silane in excess water, and thereafter combining this composition with particulate solids, to form a coating composition for metal surfaces which will impart galvanic protection thereto.

7 Claims, No Drawings

BINDER COMPOSITION AND COATING CONTAINING THE SAME

This application is a continuation of applicant's co-pending application Ser. No. 453,760, filed Mar. 22, 1974, which was a continuation-in-part of applicant's application Ser. No. 176,237, filed Aug. 30, 1971, now abandoned, which was a continuation-in-part of applicant's application Ser. No. 75,678, filed Sept. 25, 1970, and now abandoned.

The present invention relates to a binder composition, particularly a binder composition containing particulate solids and more particularly to a zinc-filled binder composition which, when applied to a metal surface, will impart galvanic protection thereto.

Many of the binder compositions used heretofore have short shelf stability and when applied to a surface provide a soft, powdery coating when cured. Furthermore, it was difficult to obtain a uniform coating when particulate solids, such as zinc were incorporated in these binder compositions. Likewise, many of the binder compositions when applied to metal substrates often cracked upon drying, thereby exposing the substrates to the environment.

Therefore, it is an object of this invention to provide a protective coating for metal surfaces. Another object of this invention is to provide an appropriate binder for incorporating particulate solids therein. Still another object of this invention is to provide an appropriate binder for incorporating zinc therein. Still another object of this invention is to provide a binder composition having relatively long shelf life and which may be readily applied to a surface in the manner of a paint. A further object of this invention is to provide a binder which will cure on a metal substrate to form a hard, abrasion-resistant and tightly-adherent film. A still further object of this invention is to provide a coating composition which exhibits improved solvent resistance and improved adhesion when applied to metal substrates.

The foregoing objects and others which will become apparent from the following description are accomplished in accordance with this invention, generally speaking, by providing a binder composition containing a hydrolyzed organotrihydrocarbonoxy silane which can be combined with particulate solids to form a paint-like coating composition having a satisfactory shelf life.

The organotrihydrocarbonoxy silanes used in the preparation of the binder composition may be represented by the formulae:

R Si (OR')$_3$ and
R Si (OR"OR"')$_3$ in which R and R' are aliphatic and aromatic hydrocarbon radicals having up to about 10 carbon atoms and more preferably from about 1 to 6 carbon atoms, R" is a divalent hydrocarbon radical having from 2 to 6 carbon atoms, and R"' is the same as R' or hydrogen. Examples of suitable monovalent hydrocarbon radicals represented by R, R' and R"' are alkyl radicals such as methyl, ethyl, butyl, hexyl, octyl, decyl and aryl radicals such as, phenyl, tolyl and xylyl. Also, R can be an alkenyl radical, such as vinyl, allyl, hexenyl and butadienyl. Divalent hydrocarbon radicals represented by R" above are ethylene, trimethylene, tetramethylene, hexamethylene, phenylene and the like.

Suitable organotrihydrocarbonoxy silanes are methyltrimethoxysilane, methyltriethoxysilane, methyltripropoxysilane, methyltributoxysilane, methyltrioctoxysilane, ethyltriethoxysilane, propyltrimethoxysilane, propyltributoxysilane, propyltrioctoxysilane, propyltridecoxysilane, butyltrimethoxysilane, butyltriethoxysilane, butyltributoxysilane, butyltrioctoxysilane, butyltridecoxysilane, butyltriphenoxysilane, hexyltrimethoxysilane, hexyltriethoxysilane, hexyltributoxysilane, hexyltrioctoxysilane, hexyltriphenoxysilane, phenyltrimethoxysilane, phenyltriethoxysilane, phenyltributoxysilane, phenyltrioctoxysilane, allyltrimethoxysilane, allyltriethoxysilane, vinyltrimethoxysilane, vinyltriethoxysilane, vinyltributoxysilane, butadienyltrimethoxysilane, methyl tri-(2-methoxy-ethoxy) silane, ethyl tri-(4-ethoxy-butoxy) silane, ethyl tri-(2-butoxy-ethoxy) silane, butyl tri-(2-ethoxy-ethoxy) silane, hexyl tri-(2-methoxy-ethoxy) silane, phenyl tri-(2-ethoxy-ethoxy) silane, methyl tri-(propylene glycol) silane, butyl tri-(ethylene glycol) silane, phenyl tri-(ethylene glycol) silane, and mixtures thereof.

These organotrihydrocarbonoxy silanes may be prepared by various methods described in the literature. For example, the hydrocarbonoxy silanes may be prepared by a Grignard-type synthesis using the corresponding hydrocarbon chloride and an alkyl orthosilicate. The general reaction is:

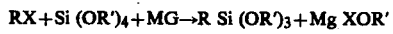

where R and R' are the same as represented above and X is a halogen. Generally, heating in the range of from about 50° C. to about 130° C. is necessary. It may be necessary to add a small amount of reagent such as methyl magnesium chloride to initiate the reaction.

Alternatively, methyltrichlorosilane may be reacted with ethanol in the presence of ammonia to form methyltriethoxysilane and ammonium chloride. Phenyltrihydrocarbonoxy silane may likewise be obtained in an analogous manner by using phenylchlorosilanes.

The organotrihydrocarbonoxy silanes may also be prepared by reacting finely divided silicon in the presence of an alcohol or phenol in a neutral or acid phase at a temperature of from 20° to 360° C., separating the silane formed from the reaction mixture and thereafter reacting the thus formed silane with an unsaturated hydrocarbon in the presence of a conventional catalyst.

The hydrocarbonoxy silanes of the formula R Si (OR"OR"')$_3$ are prepared by reacting a methyl trichlorosilane with the corresponding monoethers of alkylene glycols or mixtures thereof to produce HCl and the silane. The alkylene glycol ethers are produced by the normal reactions of the corresponding alcohols (R"'OH) with an alkylene glycol in a 1:1 addition.

The binder compositions of this invention are prepared by mixing an organotrihydrocarbonoxy silane with water in an amount sufficient to provide at least 0.8 mole of water per hydrocarbonoxy group, and more preferably from about 1.0 to 4.5 moles of water per hydrocarbonoxy group present on the silicon atom. It has been found that, where the amount of water is below about 0.8 mole per hydrocarbonoxy group the coating composition produced therefrom does not have the desired hardness, nor does it exhibit satisfactory resistance to abrasion.

These organotrihydrocarbonoxy silanes are hydrolyzed and condensed to the extent that the SiO$_2$ content ranges from about 5 to 40 percent on a weight basis. Particularly good results have been obtained with a condensate containing from about 15 to 30 percent SiO$_2$.

Although it is not essential, it is preferred, that a solvent be employed in the preparation of the binder compositions. Suitable solvents include the higher boiling ethers, such as monoalkylene glycol monoalkyl ethers, dialkylene glycol monoalkyl ethers, dialkylene glycol dialykyl ethers, monoalkylene glycol dialkyl ethers; ketones, such as acetone; alcohols, such as ethanol, isopropanol, butanol, hexanol, diacetone alcohol; glycols such as ethylene glycol and polyalkylene glycols; hydrocarbon solvents, such as hexane, heptane, benzene, toluene, xylene; chlorinated hydrocarbon solvents; water and mixtures thereof. The drying time, viscosity and so forth may be adjusted by proper choice of solvents or mixtures thereof. The solvent to hydrocarbonoxy silane ratio is subjected to wide variation depending on the characteristics desired in the finished binder. Thus, the ratio may lie anywhere within the limits of from about 0.5:1 to 10:1.

Although the amount of acid necessary for the hydrolysis of the organotrihydrocarbonoxy silane is not critical, it is preferred that sufficient acid be present to provide a pH of from about 1.0 to about 5.5 and more preferably from about 1.4 to 4.5. Generally the amount of acid, particularly hydrochloric acid, may range from about 0.001 to about 0.08 and more preferably from about 0.005 to about 0.05 percent by weight. Other inorganic acids such as sulfuric and hydrofluoric acid may be used either alone or in conjunction with hydrochloric acid.

Also, monobasic and dibasic organic acids free of hydroxyl groups and having acid strengths as measured by pKa values of from 1.0 to about 7.0 and more preferably from about 2.5 to 6.5 at 25° C. may be used as well as metal chlorides, nitrates and sulfates, where the metal is a member of Group III or IV of the Periodic Table. Examples of suitable organic acids are acetic acid, butyric acid, caproic acid, capric acid, palmitic acid, oleic acid, oxalic acid, fumaric acid, crotonic acid, acrylic acid, maleic acid, malonic acid, succinic acid, glutaric acid, adipic acid, suberic acid, sebacic acid and halogenated carboxylic acids having the above pKa value. Other organic acids which may be used are benzoic acid and alkyl phosphoric acids in which the alkyl groups contain from 1 to 4 carbon atoms.

Generally the amount of organic acid will range from about 0.1 to about 1.0 percent and more preferably from about 0.3 to about 0.8 percent by weight based on the weight of the binder composition.

Surprisingly, it was found that a more stable binder composition is obtained in using organic acids having a pKa value of from 1.0 to about 7.0 than similar compositions prepared with organic acids or halogenated organic acids having a pKa value below about 1.0. Moreover, the binder compositions prepared by using organic acids having the desired pKa value exhibit better solvent resistance and better adhesion when applied to metal substrates than similar compositions which use organic acids having a pKa value below about 1.0.

The techniques for preparing the binder compositions are known in the art; however, it is preferred that the above silane be dissolved in an organic solvent and thereafter sufficient water, preferably an acidized water, is added in an amount which will provide at least 0.8 mole per hydrocarbonoxy group present on the silicon atom. Sufficient acid should be added to provide a pH of from 1.0 to about 5.5. The solution is stirred and within a short period of time it will be evident that a definite exothermic reaction has occurred. As a result, the solution becomes quite warm, yielding a homogeneous, clear-liquid product.

The exact nature of the chemical reaction taking place between the organotrihydrocarbonoxy silane and water is not known with certainty and the present invention is not intended to be limited to any particular mode of reaction. It may, however, be postulated that what takes place is hydrolysis followed by intermolecular condensation polymerization which results in the elimination of molecules of water and/or alcohol between the silicon containing moieties. It is known, for example, that the reaction between water and the organotrihydrocarbonoxy silane produces alcohols and silanol groups. The silanol groups condense with each other and with the hydrocarbonoxy groups to form Si—O—Si linkages, water and alcohol.

The coating compositions of this invention are prepared by mixing the binder composition resulting from the foregoing hydrolysis and condensation with finely divided particulate solids, preferably zinc dust, and thereafter applied to metal substrates to impart galvanic protection thereto. Other particulate solids which may be employed are aluminum, stainless steel and magnesium; metal oxide powders such as lead oxide, iron oxide, alumina, titanium dioxide and the like. Frequently, it is desirable to employ in lieu of pure metal dust, a mixture of metal dust and a suitable filler, such as calcium and magnesium meta-silicate or minerals containing the same. Other fillers, particularly fibrous mineral fillers, such as asbestos, silica, refined clays, fibrous talc, fibrous calcium meta-silicate, gypsum and the like may also be incorporated with a metal dust, such as zinc in these coating compositions. Other additives which may be included in the coating compositions are pigments, such as zinc chromate, cadmium sulfide, and most of the lithopones.

The binder to particulate solids ratio is largely a matter of customer preference or of the specifications to be met. Generally, the binder to zinc ratio lies within the range of 50:50 to 10:90 on a weight basis. However, where a filler is included in the composition, such as the previously-mentioned calcium and magnesium meta-silicates, then the binder to total particulate ratio (zinc and filler) may go from 10:90 to as high as 70:30 on a weight basis.

Generally, these coatings can be cured at ambient temperature in about 24 hours; however, if desired, the coatings may be heat cured in an oven at temperatures ranging from about 40° C. to as high as 500° C. At these elevated temperatures, the cure time will be substantially reduced.

The coatings conforming to the present invention have a flash point from about 80° F. to about 150° F. (tag open cup method) and a pot life meeting the requirements of substantially any field of use.

These coating compositions may be applied to a cleaned metal substrate by painting, spraying or other conventional techniques known in the art. They display excellent adhesion on application and in many cases, the coating may be applied successfully to clean, steel surfaces without prior sandblasting, which is not possible with the prior coatings. Good adherence to damp or even wet steel galvanized surfaces has been achieved. The coating will not freeze nor is it in any way adversely affected by bright sun light at tropical temperatures. The coating shows very good resistance to salt spray, fuels and to organic solvents. Moreover, coating compositions prepared in the presence of organic acids exhibit better solvent resistance and better hardness and adhesion when applied to metal substrates than similar compositions prepared in the presence of inorganic acids. These coatings can be easily pigmented, hence they can be employed without an overcoat.

The invention is further illustrated by the following examples which are to be taken as in no way limitative thereof. All parts are by weight unless otherwise specified.

EXAMPLE 1

A binder composition is prepared by slowly adding with agitation 38 parts of deionized water to a reactor containing 250 parts of methyltriethoxysilane, 177 parts of ethylene glycol monoethyl ether and 0.05 part of 37 percent hydrochloric acid, and thereafter continuing to agitate the reaction mixture for about 2 hours at a temperature up to about 60° C.

The binder composition thus prepared above is mixed with zinc dust (2 to 7 microns) in a ratio of 30 parts binder to 70 parts zinc dust and thereafter applied to a lightly sandblasted steel substrate. After drying for about 24 hours at room temperature, the coating is tested for hardness in accordance with the standard hardness test. In this test, a pencil lead is employed having varying degrees of hardness corresponding to the scale 6B, 4B, 3B, F, H, 2H, 3H, 4H, 5H, etc. These values represent a progressive increase in hardness. The pencil lead is held at a 45° angle relative to the zinc coating as laid down on the steel panel and moderate force is applied until the coating is removed. The result of the hardness test is illustrated in Table I.

EXAMPLES 2 TO 11

Binder compositions are prepared in accordance with Example 1 by adding varying amounts of deionized water to a solution containing methyltriethoxysilane, ethylene glycol monoethyl ether and hydrochloric acid. The binder compositions thus prepared are then mixed with zinc dust (2 to 6 microns), dried for 24 hours, and then tested for hardness in accordance with the standard hardness test described in Example 1. The results of the hardness test are illustrated in Table I.

EXAMPLE 12

A binder composition is prepared in accordance with the procedure described in Example 1, in which 340 parts of deionized water are added to a reactor containing 250 parts of methyltriethoxysilane, and 0.6 part of 37 percent hydrochloric acid. The $SiO_2$ content of the resulting binder composition is calculated to be about 14.3 percent.

A binder composition thus prepared is mixed with zinc dust (2 to 6 microns) in a ratio of 30 parts binder to 70 parts zinc dust and thereafter applied to a lightly sandblasted steel substrate. After drying for about 36 hours at room temperature, the coating exhibits a hardness of about 3H.

EXAMPLE 13

A binder composition is prepared in accordance with the procedure described in Example 12, in which about 340 parts of deionized water are added to a reactor containing 250 parts of methyltriethoxysilane and 0.69 part of 37 percent hydrochloric acid. After about 2 hours the reaction product is heated up to about 120° C. to remove the volatile materials. The resulting product is diluted with ethylene glycol monoethyl ether to form a composition having an $SiO_2$ content of about 18 percent.

When 30 parts of this binder are mixed with 70 parts zinc dust and applied on a clean steel panel, a satisfactory coating is obtained.

EXAMPLE 14

The procedure in Example 1 for preparing a binder composition is repeated, except that 108 parts of deionized water are added to a reactor containing 304 parts of butyltributoxysilane and 0.59 part of 37 percent hydrochloric acid. The $SiO_2$ content of the resulting binder composition is calculated to be about 14.6 percent.

When 20 parts of this binder is mixed with 80 parts zinc dust and applied on a clean steel panel, a satisfactory coating is obtained.

EXAMPLE 15

In accordance with the procedure described in Example 1, 108 parts of deionized water are added to a reactor containing 240 parts of phenyltriethoxysilane and 0.3 part of 37 percent hydrochloric acid. The $SiO_2$ content of the resulting binder composition is calculated to be about 17.2 percent.

The binder composition thus prepared is then mixed with zinc dust (2 to 6 microns) in a ratio of 50 parts binder to 50 parts zinc dust and thereafter applied to a lightly sandblasted steel substrate. After drying for about 1 hour at a temperature of about 150° C., the coating exhibits a hardness value of about 3H.

TABLE I

| Example No. | $CH_3Si(OC_2H_5)_3$ (Parts) | Solvent Ether* (Parts) | HCl 37% (Parts) | Water (Parts) | Calculated Moles Water per Silane Ethoxy | Binder $SiO_2$ (Percent) | Coating Hardness (24 Hours) |
|---|---|---|---|---|---|---|---|
| 1 | 250 | 177 | 0.05 | 38 | 0.50 | 18 | F |
| 2 | 500 | 318 | 0.09 | 99 | 0.65 | 18 | F |
| 3 | 500 | 303 | 0.09 | 114 | 0.75 | 18 | F-H |
| 4 | 500 | 284 | 0.09 | 133 | 0.88 | 18 | 2 H |
| 5 | 500 | 265 | 0.09 | 152 | 1.0 | 18 | 2 H |
| 6 | 250 | 125 | 0.05 | 84 | 1.1 | 18 | 3 H |
| 7 | 500 | 250 | 0.09 | 180 | 1.2 | 18 | 5 H |
| 8 | 250 | 109 | 0.05 | 99 | 1.3 | 18 | 6 H |
| 9 | 250 | 93 | 0.05 | 115 | 1.5 | 18 | 6 H |
| 10 | 250 | 56 | 0.05 | 152 | 2.0 | 18 | 6 H |
| 11 | 250 | 18 | 0.05 | 190 | 2.5 | 18 | 6 H+ |

*ethylene ethylene glycol monoethyl ether

EXAMPLE 16

In accordance with the procedure in Example 1, 108 parts of deionized water containing 0.5 part of 37 percent hydrochloric acid are added to a reactor containing 322 parts of methyltriphenoxysilane. The $SiO_2$ content of the resulting binder composition is calculated to be about 13.9 percent.

The binder composition thus prepared is mixed with zinc dust (2 to 6 microns) in a ratio of 30 parts binder to 70 parts zinc dust and thereafter applied to a sandblasted steel substrate. After drying for up to 5 hours at a temperature of about 150° C., the coating exhibits a hardness value above 3H.

EXAMPLE 17

In accordance with the procedure described in Example 1, 108 parts of deionized water are added to a reactor containing 430 parts of methyltrioctoxysilane and 0.6 part of 37 percent hydrochloric acid. The $SiO_2$ content of the resulting binder composition is calculated to be about 11.1 percent.

The binder composition is then mixed with zinc dust (2 to 6 microns) in a ratio of 50 parts binder to 50 parts zinc dust and thereafter applied to a sandblasted steel substrate. After drying at a temperature of about 180° C. for 2 hours, the coating exhibits a hardness value of from 2H–3H.

EXAMPLE 18

A binder composition is prepared by slowly adding with agitation about 115 parts of deionized water containing about 0.02 part of 37 percent hydrochloric acid to a reactor containing 250 parts of methyltriethoxysilane. The reaction mass is agitated for about 2 hours at a temperature of about 45° C. and then about 93 parts of ethylene glycol monomethyl ether is added to the reaction mass.

The resulting composition is then mixed with zinc dust (2 to 6 microns) in a ratio of 60 parts binder to 40 parts zinc dust and thereafter applied to a clean steel substrate. After drying for about 24 hours, the coating exhibits a hardness value of about 4H.

EXAMPLE 19

In accordance with the procedure described in Example 1, a binder composition is prepared by slowly adding with agitation 115 parts of deionized water containing 0.02 part of 37 percent hydrochloric acid to a reactor containing 250 parts of methyltriethoxysilane and 93 parts of ethyl alcohol and thereafter continuing to agitate the reaction mixture for 2 hours at a temperature of about 45° C.

The binder composition thus prepared is mixed with zinc dust in a ratio of 60 parts binder to 40 parts zinc dust and applied to a lightly sandblasted steel substrate. After drying for about 24 hours at room temperature, the coating exhibits a hardness value of about 3H.

EXAMPLE 20

A binder composition is prepared by slowly adding with agitation 76 parts of deionized water to a reactor containing 250 parts of methyltriethoxysilane, 133 parts of ethylene glycol monomethyl ether and 0.05 part of 37 percent hydrochloric acid and thereafter continuing to agitate the reaction mixture for about 2 hours at a temperature up to about 50° C. The reaction mass is then heated to a temperature of about 120° C. to remove the volatile materials, while additional ethylene glycol monomethyl ether is added to maintain the $SiO_2$ content of the reaction mass at about 18 percent.

The composition thus prepared has a flash point in the range of about 115° F. (tag open cup method).

The binder composition thus prepared is mixed with zinc dust (2 to 6 microns) in a ratio of 30 parts binder to 70 parts zinc dust and thereafter applied to a clean steel substrate. After drying for 36 hours at room temperature, the coating exhibits excellent hardness.

EXAMPLE 21

A binder composition is prepared by slowly adding with agitation 76 parts of deionized water to a reactor containing 268 parts of methyl tri-(2-methoxy-ethoxy) silane, 53 parts of ethylene glycol monoethyl ether and 0.05 part of 37 percent hydrochloric acid and thereafter continuing to agitate the reaction mixture for about 2 hours at a temperature up to about 75° C.

The binder composition thus prepared is mixed with zinc dust (2 to 6 microns) in a ratio of 30 parts binder to 70 parts zinc dust and thereafter applied to a clean steel substrate. After drying at a temperature of about 100° C. for about 2 hours, a satisfactory coating is obtained.

EXAMPLE 22

A binder composition is prepared in accordance with the procedure described in Example 21, except that 226 parts of methyl tri-(ethylene glycol) silane is substituted for methyl tri-(2-methoxy-ethoxy) silane.

The binder thus prepared is mixed with zinc dust (2 to 40 microns) in a ratio of 30 parts binder to 70 parts zinc dust and applied to a clean steel substrate. After drying for about 2 hours at 100° C., a satisfactory coating is obtained.

EXAMPLE 23

A binder composition is prepared by slowly adding with agitation 500 parts of methyltriethoxysilane to a reactor containing 264 parts of ethylene glycol monoethyl ether, 152 parts deionized water and 3 parts of acetic acid and thereafter agitating the reaction mixture for about 2 hours at a temperature up to about 31° C. The reaction mixture is then filtered, yielding a clear liquid.

The binder composition thus prepared above is mixed with zinc dust (2 to 7 microns) in a ratio of 30 parts binder to 70 parts zinc dust and thereafter applied to lightly sandblasted steel substrates. After drying for about 24 hours at room temperature, the coating exhibits a hardness value of about 2H. The coated substrates exhibit very good solvent resistance after immersion is methyl ethyl ketone or ethylene glycol monoethyl for 48 hours. Similar panels coated in accordance with the procedure of Example 1 exhibit substantially no solvent resistance when contacted with either of the above solvents.

EXAMPLE 24

A binder composition is prepared in accordance with the procedure described in Example 23 in which benzoic acid is substituted for acetic acid. The resulting binder when combined with zinc dust and applied to a metal substrate exhibits good solvent resistance.

EXAMPLE 25

A binder composition is prepared in accordance with the procedure described in Example 23 in which adipic acid is substituted for acetic acid.

A coating containing the binder and zinc dust when applied to a metal substrate exhibits good solvent resistance.

EXAMPLE 26

To about 100 parts of the binder composition prepared in accordance with Example 7 is added about 250 parts of zinc dust and 24 parts of a mixed calcium-magnesium-aluminum silicate having a particle size averaging about 8.0 microns. After mixing, the slurry is applied to a sandblasted iron surface. The coating exhibits a hardness value of about 3H after drying for about 24 hours.

EXAMPLE 27

To about 125 parts of binder prepared in accordance with the procedure described in Example 7 is added with stirring 250 parts of zinc dust, 70 parts talc (asbestone, 625-a fibrous magnesium and calcium silicate mineral having a particle size of 2 microns) and 10 parts red iron oxide. The resultant slurry is applied to a clean steel surface. It adheres well and exhibits an excellent hardness value in 24 hours.

EXAMPLE 28

A binder composition is prepared by slowly adding with agitation 1000 parts of methyltriethoxysilane to a reactor containing 528 parts of ethylene glycol monoethyl ether, 304 parts of deionized water and 0.10 parts of 32 percent by weight of hydrochloric acid and thereafter agitating the reaction mixture for about 2 hours at a temperature of about 50°±2° C. The reaction mixture is filtered, yielding a clear liquid.

After aging the binder at room temperature for 3 days, a trace of solids is observed.

Approximately 170 parts of the binder composition prepared above is mixed with about 15 parts of silica filler and about 3 parts of a refined clay with agitation.

A zinc dust coating composition is then prepared by mixing about 25 parts of zinc dust with about 9 parts of the binder-filler composition prepared above. The coating composition is applied to lightly sandblasted steel substrates. After drying for about 24 hours at room temperature, the coating is tested for hardness in accordance with Example 1. The coated substrates are then immersed in ethylene glycol monoethyl ether and methyl ethyl ketone to determine the solvent resistance of the coating. The results are illustrated in Table II.

EXAMPLE 29

A binder composition is prepared in accordance with the procedure described in Example 28 except that 6 parts of acetic acid (pKa 4.75 at 25° C.) is substituted for the hydrochloric acid. After aging for 3 days a trace of solids is observed. A coating composition is prepared in accordance with the procedure described in Example 28 and applied to lightly sandblasted steel substrates. The hardness value and the solvent resistance of the coating is illustrated in Table II.

EXAMPLE 30

A binder composition is prepared in accordance with the procedure described in Example 28 except that 6 parts of chloroacetic acid (pKa 2.85 at 25° C.) is substituted for the hydrochloric acid. After aging for 3 days a trace of solids is observed.

A coating composition is prepared in accordance with the procedure described in Example 28 and applied to lightly sandblasted steel substrates. The hardness value and the solvent resistance of the coating is illustrated in Table II.

EXAMPLE 31

A binder composition is prepared in accordance with the procedure described in Example 28 except that 6 parts of trichloroacetic acid (pKa 0.70 at 25° C.) is substituted for the hydrochloric acid. After aging for 3 days a substantial amount of solids is observed.

A coating composition is prepared in accordance with the procedure described in Example 28 and applied to lightly sandblasted steel substrates. The hardness value and the solvent resistance of the coating is illustrated in Table II.

EXAMPLE 32

A binder composition is prepared in accordance with the procedure described in Example 28 except that 6 parts of trifluoroacetic acid having a pKa value substantially less than 1 at 25° C. is substituted for the hydrochloric acid. Substantial amount of solids is observed after aging for 3 days.

A coating composition is prepared in accordance with the procedure described in Example 28 and applied to lightly sandblasted steel substrates. The hardness value and the solvent resistance of the coating is illustrated in Table II.

TABLE II

| Example No. | $CH_3Si(OC_2H_5)_3$ (Parts) | Solvent Ether* (Parts) | Acid Type | Acid (Parts) | Water (Parts) | Coating Hardness (24 Hours) | Solvent Resistance MEK | Solvent Resistance Ether* |
|---|---|---|---|---|---|---|---|---|
| 28 | 1000 | 528 | HCl | 0.1 | 304 | H | P | F |
| 29 | 1000 | 528 | HOAc | 6 | 304 | 2 H | VG | VG |
| 30 | 1000 | 528 | HOAcCl | 6 | 304 | 2 H | VG | VG |
| 31 | 1000 | 528 | $HOAcCl_3$ | 6 | 304 | 6 B | VP | VP |

TABLE II-continued

| Example No. | CH₃Si(OC₂H₅)₃ (Parts) | Solvent Ether* (Parts) | Acid Type | Acid (Parts) | Water (Parts) | Coating Hardness (24 Hours) | Solvent Resistance MEK | Solvent Resistance Ether* |
|---|---|---|---|---|---|---|---|---|
| 32 | 1000 | 528 | HOAcF₃ | 6 | 304 | 6 B | VP | VP |

*Ether ethylene glycol monoethyl ether
MEK methyl ethyl ketone
HOAc acetic acid
HOAcCl chloroacetic acid
HOAcCl₃ trichloroacetic acid
HOAcF₃ trifluoroacetic acid
HCl hydrochloric acid (32%)
P Poor
F Fair
VG Very Good
VP Very Poor A comparison of Examples 29 and 30 with Examples 31 and 32 show that a pKa value below about 1.0 produces an unstable binder composition. Moreover, Table II shows that an organic acid having a pKa value below 1.0 produces a soft coating which does not exhibit satisfactory solvent resistance.

When the above examples are repeated using other hydrocarbonoxy silanes, in the presence of other solvents and particulate solids, coating compositions are obtained which have properties substantially the same as those of the specific examples.

Although specific examples are mentioned and have been herein described, it is not intended to limit the invention solely thereto but to include all the variations and modifications falling within the spirit and scope of the appended claims.

The invention claimed is:

1. A coating composition consisting essentially of zinc dust and a binder which consists essentially of a condensate having an SiO₂ content of from 5 to 40 percent by weight, said condensate is obtained from the reaction of a silane selected from the group consisting of R Si (OR')₃ and
R Si (OR"OR"')₃ in which R and R' represent hydrocarbon radicals having up to 10 carbon atoms, R" is a divalent hydrocarbon radical having from 2 to 6 carbon atoms and R"' is selected from the group consisting of hydrocarbon radicals having up to 10 carbon atoms and hydrogen, with sufficient water to provide at least 0.8 mole of water per hydrocarbonoxy group connected to the silicon atom in the presence of a solvent for said condensate and a sufficient amount of an organic acid to provide a pH of from about 1.0 to about 5.5, said organic acid is free of hydroxyl groups, and has a pKa value in an aqueous solution of from 1.0 to about 7.0 at 25° C., and the ratio of binder to zinc dust is from 50:50 to 10:90 on a weight basis.

2. The coating composition of claim 1 wherein the binder composition is prepared in the presence of from 0.1 to about 1.0 percent by weight of the organic acid.

3. The coating composition of claim 1 wherein the coating composition contains in addition to the zinc, a filler material the total ratio of binder to zinc and filler being from 70:30 to 10:90 on a weight basis.

4. The coating composition of claim 3 wherein the filler material is an alkaline earth metal silicate comprising calcium and/or magnesium.

5. The coating composition of claim 3 wherein the filler material is a fibrous mineral substance.

6. The coating composition of claim 1 wherein the silane has the formula

R Si(OR"OR"')₃ in which R represents a hydrocarbon radical having up to 10 carbon atoms, R" is a divalent hydrocarbon radical having from 2 to 6 carbon atoms and R"' is selected from the group consisting of hydrocarbon radicals having up to 10 carbon atoms and hydrogen.

7. A method for preparing a binder composition having a high flash point which comprises reacting a silane selected from the group consisting of R Si (OR")₃ and
R Si (OR"OR"')₃ in which R and R' represent hydrocarbon radicals having up to 10 carbon atoms, R" is a divalent hydrocarbon radical having from 2 to 6 carbon atoms and R"' is selected from the group consisting of hydrocarbon radicals having up to 10 carbon atoms and hydrogen, with sufficient water to provide at least 0.8 mole of water per hydrocarbonoxy group connected to the silicon atom in the presence of sufficient acid to provide a pH of from about 1.0 to 5.5 to form a condensate having an SiO₂ content of from 5 to 40 percent by weight, removing the volatile materials while simultaneously adding a higher boiling alkylene glycol alkyl ether which is a solvent for the condensate to the binder composition to maintain a substantially constant SiO₂ content and continuing to remove the volatile materials until the flash point of the reaction mixture is at least about 100° F.

* * * * *